United States Patent [19]

Entzminger

[11] Patent Number: 4,721,007
[45] Date of Patent: Jan. 26, 1988

[54] VARIABLE RATIO LEVER ARM MECHANISM

[76] Inventor: William W. Entzminger, P.O. Box 835067, Richardson, Tex. 75083

[21] Appl. No.: 15,547

[22] Filed: Feb. 13, 1987

Related U.S. Application Data

[62] Division of Ser. No. 556,407, Nov. 30, 1983, abandoned.

[51] Int. Cl.$^4$ .......................... G05G 1/04; F01L 1/34; F16H 35/08
[52] U.S. Cl. .......................................... 74/522; 74/32; 74/83.17; 74/109; 74/834; 123/30.16
[58] Field of Search ............... 74/32, 30, 89.11, 89.12, 74/89.17, 109, 110, 422, 522, 567, 834; 123/90.16, 90.15, 90.17, 90.18

[56] References Cited

U.S. PATENT DOCUMENTS

| | | | |
|---|---|---|---|
| 273,276 | 3/1883 | Hawkinson | 74/522 |
| 733,799 | 7/1903 | Benedict | 74/522 |
| 1,139,893 | 5/1915 | More | 74/89.12 |
| 1,271,568 | 7/1918 | Hall | 74/522 |
| 1,395,851 | 11/1921 | McLean | 123/90.16 |
| 1,509,262 | 9/1924 | Royce | 74/522 |
| 1,767,403 | 6/1930 | Sauvage | 74/522 |
| 2,259,713 | 10/1941 | Valentine | 74/834 |
| 2,410,335 | 10/1946 | Burdick | 74/522 |
| 2,448,419 | 8/1948 | Coulter | 74/522 |
| 2,699,119 | 1/1955 | Healey | 74/834 |
| 2,736,212 | 2/1956 | Spence | 74/522 |
| 2,997,888 | 8/1961 | Rust | 74/522 |
| 3,157,166 | 11/1964 | MacNeill | 74/522 |
| 3,413,965 | 12/1968 | Gavasso | 74/522 |
| 3,513,919 | 5/1970 | Pennington | 74/109 |
| 3,713,366 | 1/1973 | McCombs | 74/522 |
| 3,786,938 | 1/1974 | Kirkham | 74/109 |
| 3,888,512 | 6/1975 | Peterson | 74/522 |
| 4,520,549 | 6/1985 | Whitley et al. | 74/109 |
| 4,522,225 | 6/1985 | Llauge et al. | 74/109 |
| 4,561,592 | 12/1985 | Fender et al. | 74/109 |
| 4,572,028 | 2/1986 | Witte | 74/522 |
| 4,584,893 | 4/1986 | Harding et al. | 74/89.17 |
| 4,633,726 | 1/1987 | Chang | 74/89.17 |

FOREIGN PATENT DOCUMENTS

| | | | |
|---|---|---|---|
| 548762 | 10/1956 | Italy | 74/522 |
| 0015961 | 2/1977 | Japan | 74/89.17 |
| 1180311 | 2/1970 | United Kingdom | 74/522 |

OTHER PUBLICATIONS

Machine Design, Sep. 29, 1960, vol. 32, #20, p. 104.
Mechanical Movements, pp. 32, 33, Henry T. Brown, 17th Edition, published by Brown & Seward, 1893.

Primary Examiner—Gary L. Smith
Assistant Examiner—Vinh Luong
Attorney, Agent, or Firm—Glaser, Griggs & Schwartz

[57] ABSTRACT

A variable ratio rocker arm is provided for use in combination with the valve stem and push rod of an internal combustion engine. The rocker arm has an elongated slot defined between a rod seat and a toothed rack. A fulcrum rod is provided with a toothed sector and a curved sector, with the toothed sector being engaged with the toothed rack portion of the rocker arm. A roller bearing assembly is movably disposed between the rod curved sector and the rod seat, with the roller bearing assembly being rollable along the rod seat. An actuator arm is coupled to the fulcrum rod for simultaneously rotating and translating the fulcrum rod through the rocker arm slot. The operating arm causes the fulcrum rod to rotate and translate along the mating toothing from one point of pivotal engagement, corresponding to a first engine operating condition, to another point of pivotal engagement, corresponding to a second engine operating condition.

8 Claims, 15 Drawing Figures

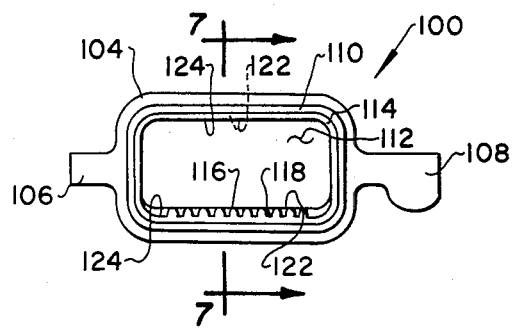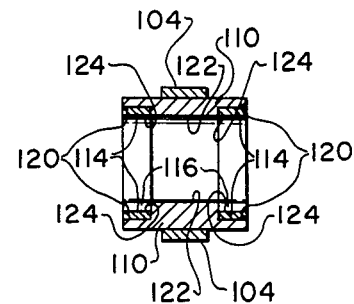
FIG. 6     FIG. 7
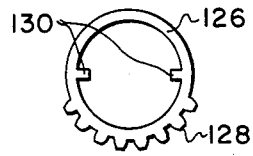
FIG. 8A
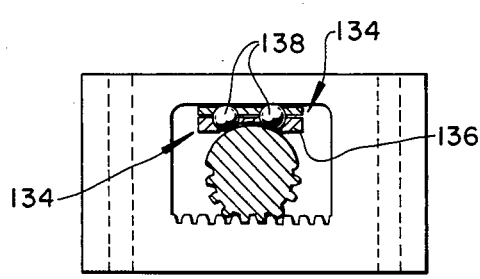
FIG. 9
FIG. 8B
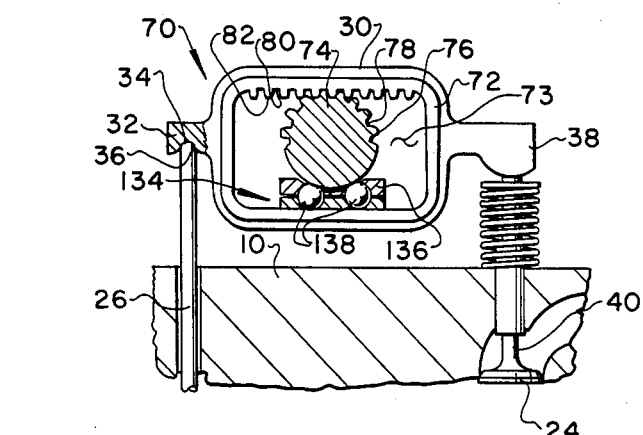
FIG. 10

VARIABLE RATIO LEVER ARM MECHANISM

CROSS REFERENCE TO RELATED APPLICATION

This is a divisional of application Ser. No. 556,407, filed Nov. 30, 1983 now abandoned.

BACKGROUND OF THE INVENTION

The present invention relates to a pivoting lever arm mechanism utilized in transmitting reciprocal linear motion and/or force by pivoting about a fulcrum pivot point intermediate the ends of the lever arms, and more particularly to a lever arm of this sort having the capability of verying the ratio of lengths of moment arms from respective ends of the lever arm about the fulcrum pivot point therebetween.

The instant invention may be utilized in mechanical devices wherein reciprocal linear motion is to be transmitted (1) in a different direction, (2) in a specifically defined ratio of distances of linear movements, or (3) in instances wherein the linear motion causing movement of the lever arm is provided directly by the rotational movement of a cam device having one or more lobes thereon, or wherein the linear motion is provided by a lever, piston or other power input device, the effect of which is to reciprocally urge the end of the lever arm in an arcing movement pattern about the fulcrum pivot point.

Heretofore in the field of overhead valve internal combustion engines, valve rocker arms have been constrained to reciprocal rotational movement about a fixed fulcrum point. Because this fulcrum pivot point is fixed relative to the fixed location of the engine valves and camshaft and/or pushrods, the amount of valve opening is constant throughout the entire range of engine speeds and engine load conditions. Therefore, it has been considered highly desirable to provide a means whereby the amount of valve opening may be varied and controlled during engine operation in response to variations in engine load demand. Specifically, it has been desirable to provide a device for permitting the selective increase in valve opening amount in relation to increased engine R.P.M. and additionally, decrease the amount of valve opening at engine speeds below the optimum power peak point designed into the specific engine camshaft. At engine speeds below this optimum power peak, a decrease in amount of valve opening proportional to R.P.M. prevents the camshaft from "loading" and, therefore, provides greater torque at engine speeds in this below peak range. In a similar manner, at engine speeds above this power peak, an increase in amount of valve opening proportional to R.P.M. provides greater power output in this above power peak range. The end result is to effectively broaden the optimum power peak curve, by effecting a power peak that actually shifts as a function of valve opening, which is related to actual engine R.P.M. In this manner, increased fuel economy is obtained at all engine speeds because the actual amount of valve opening is optimum across essentially the entire speed range for the specific camshaft design.

The instant invention has specific application to internal combustion engines, wherein the lever arm takes the form of the rocker arm on overhead valve type engines wherein the reciprocating linear motion is transmitted from a rotating cam either directly to the rocker arm or indirectly to the rocker arm through a pushrod member. The rocker arm pivots about a fulcrum point so that the reciprocating arcing motion transmitted to one end of the rocker arm is passed therethrough, via oscillatory rotation about the fulcrum pivot point, to the other end of the rocker arm which engages the stem of a valve situated within the engine head to thereby selectively open the valve to permit intake and exhaust gases to pass therearound.

The present invention provides the means whereby the ratio of the distance of reciprocal arcing movement of the end of the rocker arm that engages the camshaft or pushrod relative to the fulcrum pivot point, to the distance of arcing movement of the end of the rocker arm that engages the valve stem may be varied in response to variations in engine load requirements while the engine is operating.

It should be apparent that the instant invention has numerous applications other than rocker arms for internal combustion engines. However, for purposes of explanation, it will be described and explained in detail with reference to utilization with internal combustion engine valve opening mechanisms.

SUMMARY OF THE INVENTION

The present invention provides a novel variable ratio lever arm mechanism which may be used with an overhead valve type internal combustion engine for shifting the fulcrum pivot point about which the lever pivots relative to the opposing ends of the lever arm. The invention will be described in terms of a valve opening rocker arm which is retained in place relative to the position of the valve stem and pushrod, or point of contact of a camshaft acting on the rocker arm. The rocker arm incorporates an essentially elongate through aperture through which the fulcrum rod is functionally positioned, so that the rocker arm may pivot about the fulcrum rod. The fulcrum rod is laterally translatable within the elongate aperture of the rocker arm in a manner to permit changing of the ratio of the moment arms of each end of the rocker arm relative to the fulcrum rod pivot point. This translation of the rocker arm pivot point changes the relative arc length of travel of each end of the rocker arm. In this manner, the amount of valve opening can be altered and controlled for any given constant amount of pushrod reciprocal movement or camshaft lift.

The laterally shiftable fulcrum rod is retained in functional position within elongate through apertures formed in stationary shaft supports which are mounted directly to the head of the internal combustion engine. The geometric design of these through apertures within the shaft supports dictates the lateral motion of the fulcrum rod in order to shift the pivot point of the rocker arms about the fulcrum rod to effect the desired change in moment arm ratios.

BRIEF DESCRIPTION OF THE DRAWINGS

For a detailed description of the preferred embodiment of the invention, reference is made to the accompanying drawings in which:

FIG. 6 is a side view similar to FIG. 2 of a second alternative embodiment of a rocker arm utilizing spline inserts therein;

FIG. 7 is a vertical sectional view taken along lines 7—7 of FIG. 6, showing the position of the inserts relative to the rocker arm;

FIG. 8A is a side view of the spline ring utilized in the second alternative embodiment;

FIG. 8B is a vertical sectional view of the spline ring and spline inserts, showing their relative thicknesses and orientations;

FIG. 9 is a side view similar to FIG. 3 of a third alternative embodiment of a stationary shaft support, showing a roller assembly functionally positioned between the fulcrum rod and the mating load bearing surface of the support bracket;

FIG. 10 is a side view similar to FIG. 4 of a third alternative embodiment of a rocker arm, showing a roller assembly functionally positioned between the fulcrum rod and the mating load bearing surface of the rocker arm;

DETAILED DESCRIPTION OF THE INVENTION

Figure 1:
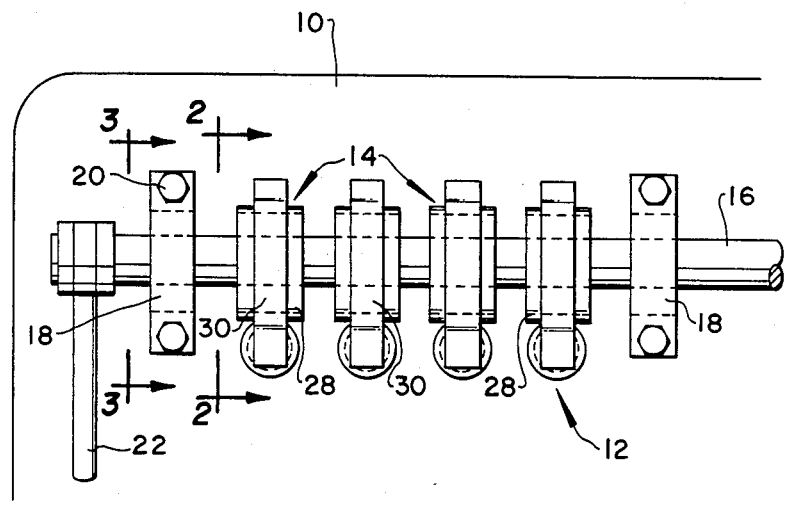
FIG. 1 is a top view of a representative overhead valve head of an internal combustion engine showing the valve and rocker arm assembly mechanism utilizing the present invention in functional position thereon.

Turning now to the drawings, wherein like parts are indicated throughout the specification and drawings with the same reference numerals, and more specifically to FIG. 1, a typical valve head 10 of an internal combustion engine is shown in a top view. A portion of a variable ratio rocker arm assembly mechanism incorporating the concept of the variable ratio level arm mechanism of the present invention is shown, generally illustrated at 12, functionally mounted on top of the head 10. For purposes of simplicity in explanation, the instant invention will be described in terms of its application as a rocker arm assembly utilized in a conventional overhead valve type internal combustion engine. However, it is to be understood that the variable ratio level arm mechanism of the instant invention is not to be so limited in its application and use, but rather may be equally well adapted to use in any mechanical application wherein it is desirable or advantageous to utilize the inventive concept of varying the fulcrum point in a pivoting lever arrangement to thereby alter the ratio of distance of linear travel of connecting rods or the like associated therewith.

As utilized in an internal combustion engine, the variable ratio level arm mechanism of the present invention takes the form of a rocker arm 14 mounted for pivotal movement upon a fulcrum rod 16. The fulcrum rod 16 is maintained in a spaced relationship relative to the valve head 10 by a stationary shaft support 18, hard mounted to the valve head by bolts 20 or other similar mounting apparatus. The fulcrum rod 16 also includes an operating lever 22 or other similar device for rotating the fulcrum rod in response to changing load conditions on the engine, as will be explained in greater detail hereinbelow.

Figure 2:
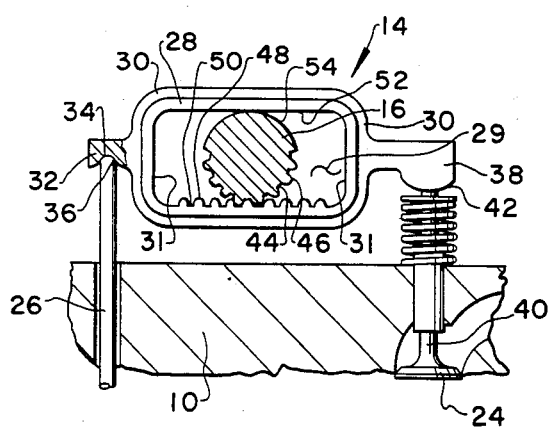
FIG. 2 is a side view of a preferred embodiment of a rocker arm in functional position about the fulcrum, pushrod and valve stem taken along lines 2—2 of FIG. 1.

As shown in FIG. 2, the rocker arm 14 is functionally positioned about the fulcrum rod 16 in order to pivot thereabout to cause opening of a valve 24 in response to linear (upward as shown in the drawings) movement of a pushrod 26 in a customary manner. The rocker arm 14 comprises an inner sleeve 28 of generally rectangular cross-section, the sleeve being pressfitted into and brazed, tack-welded or otherwise permanently fixed to a rocker arm body portion 30. The sleeve 28 defines an elongate through passageway or aperture 29 through the rocker arm by which the rocker arm is pivotally mounted to the fulcrum rod. Of course, the rocker arm could also be formed of a single piece, with an elongate aperture machined or otherwise formed therein. The body portion 30 includes a first end 32 for engaging the pushrod 26. As shown, the pushrod 26 includes a semi-spherical end 34 which engages a mating semi-spherical receptacle 36 in the rocker arm body portion first end 32. Those skilled in the art will immediately recognize that such mechanical coupling is commonly utilized in conjunction with hydraulically operated valve lifters, there being no mechanical adjustment necessary for efficient opening of the valve 24. Additionally, of course, the present invention contemplates using standard mechanical "solid" valve lifters, in which case a mechanical adjustment, commonly a screw mechanism carried by the rocker arm body portion first end 32, is utilized to effect the necessary mechanical adjustment.

The rocker arm body portio 30 also includes a second end 38 opposite the first end 32, the second end having a valve stem engaging surface 42 for engaging the end of a valve stem 40 of the valve 24. Generally, the end of the valve stem 40 is as flat as possible; therefore, the valve stem engaging surface 42 is slightly arcuate in order that the engagement between the valve stem and the rocker arm will be as much of a surface contact (theoretically a line contact) as is possible, across the entire range of pivot of the rocker arm about the fulcrum rod 16. It is imperative to maintain this surface contact between the rocker arm surface 42 and the top of the valve stem. The instant invention does so in a unique manner, while additionally reducing any side loading on the valve stem created by conventional fulcrum shaft-type rocker arm assemblies.

As shown in FIG. 2, the fulcrum rod 16 incorporates a number of axial splines 36 defining axial grooves 44 therebetween. As shown, these grooves and splines 44, 46 are formed only on essentially the bottom half of the fulcrum rod 16, the top half thereof retaining the cylindrical shape. These axial grooves and splines 44, 46 on the fulcrum rod 16 are adapted to engage mating splines and grooves 48, 50 formed in the bottom of the aperture 29 formed in the rocker arm sleeve 28. Those skilled in the art will readily appreciate that the rocker arm and fulcrum rod assembly thus described pivots in a manner different from conventional rocker arm and fulcrum rod assemblies. Whereas conventional rocker arms pivot about the geometric centerline axis of the fulcrum rod due to their concentric cylindrical relationship, the rocker arm 14 of FIG. 2 pivots about the fulcrum rod 16 about a pivot point generally along the midpoint of contact between the mating splines, as in other meshing gear mechanisms, this pivot point actually moving as the rocker arm pivots relative to the fulcrum rod. In this regard, it will be apparent that any contact between the upper inner surface 52 of the rocker arm sleeve aperture and the upper surface 54 of the fulcrum rod 16 will be a sliding contact, and the contact between the lower portion of the fulcrum rod and the mating inner surface of the rocker arm sleeve will be a purely gear mesh type contact between splines and grooves on the fulcrum rod and rocker arm sleeve as the fulcrum rod "walks" along the splined surface. As a practical matter, however, the width (height) of the rocker arm aperture will be slightly greater than the diameter of the fulcrum rod in order to permit thermal expansion thereof without interference. Therefore, there will usually be no actual contact between these surfaces.

Figure 3:
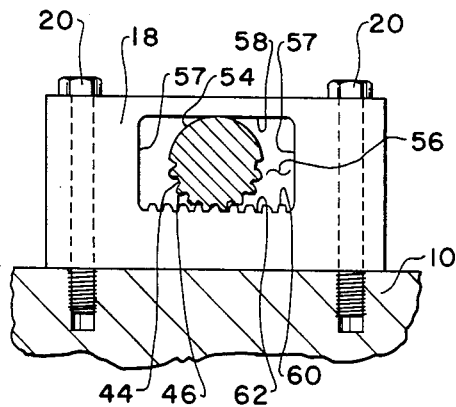
FIG. 3 is a side view of a preferred embodiment of a stationary shaft support of the rocker arm assembly mechanism taken along lines 3—3 of FIG. 1.

The rocker arm 14 shown in FIG. 2 functions with the stationary shaft support 18 shown in FIG. 3 to retain the fulcrum rod 16 and rocker arm in functional position relative to the valve head, the pushrod and valve stem. The stationary shaft support includes an aperture therethrough 56 having an upper inner surface 58 and a lower inner surface defined by a series of alternate splines and grooves 60, 62 that cooperate with the mating grooves and splines 44, 46 on the fulcrum rod 16 to retain the fulcrum rod in functional position as shown. Those skilled in the art will readily appreciate that the shaft support aperture upper inner surface 58 and the fulcrum rod upper surface 54 are two of the mating load bearing surfaces in the variable ratio rocker arm assembly utilizing the present invention. In this regard, these mating surfaces are preferably surface-hardened and highly grounded and polished in order to improve the wear characteristics thereof and to decrease any friction between the two surfaces during operation, as will be explained in greater detail hereinbelow. Regarding the mating load bearing surfaces of the fulcrum rod and rocker arm, referring again to FIG. 2, these load bearing surfaces are defined by the alternate splines and grooves on the lower portion of the fulcrum rod and lower inner surface of the rocker arm sleeve aperture. Therefore, these mating surfaces are additionally surface hardened and highly ground and polished for identical reasons, although, of course, the contact between these latter two mating surfaces is different from that of the former two mating surfaces.

OPERATION OF THE PREFERRED EMBODIMENT

The variable ratio rocker arm assembly utilizing the present invention operates similarly to conventional rocker arm assemblies, in that the rocker arm is pivotally mounted on the fulcrum rod for oscillatory pivotal movement thereabout in response to reciprocal linear movement of the pushrod to transfer this reciprocal linear movement and resulting force to the valve stem 40 in order to open the valve 24. The fulcrum rod 16 is retained in functional position relative to the rocker arm by the action of the axial grooves and splines 44, 46 thereon intermeshing with the mating grooves and splines 60, 62 on the shaft support aperture lower inner surface. With the fulcrum rod retained in stationary position relative to the stationary shaft support, the rocker arm pivots about the fulcrum rod in a manner to maintain approximately constant the ratios of the linear reciprocal movement of the pushrod relative to the linear reciprocal movement of the valve stem, as in conventional rocker arm assemblies. Because the reciprocal linear distance that the pushrod travels in always constant, with the fulcrum rod in stationary functional position, the corresponding linear distance the valve stem travels (i.e., the corresponding amount of valve opening) also remains constant.

When it is desirable to increase the amount of valve opening (i.e., increase the reciprocal linear distance that the valve stem 40 travels in response to the force transmitted through the rocker arm), those skilled in the art will readily appreciate that this is easily accomplished by rotating the fulcrum rod in the counterclockwise direction, as viewed in FIGS. 2 and 3. This counterclockwise rotation fo the fulcrum rod is typically accomplished by the fulcrum rod operating lever 22, which is coupled to an actuator controlled by electronics, vacuum, mechanical or hydraulic pressure, etc., to rotate the fulcrum rod in response to certain enging parameters. Such mechanism for controlling the fulcrum rod operating lever does not constitute a part of the present invention, and therefore will not be discussed in detail herein.

Those skilled in the art will readily appreciate that as the fulcrum rod is rotated in the counterclockwise direction as viewed in FIGS. 2 and 3, due to the fact that the stationary shaft support is fixed relative to the valve head, pushrod and valve stem, the effect of rotating the fulcrum rod counterclockwise is to translate the geometric centerline axis of the fulcrum rod in the leftward direction. Similarly, a clockwise rotation of the fulcrum rod has the effect of translating the geometric axis of the fulcrum rod in the rightward direction. It should now be easily seen that with a counterclockwise rotation of the fulcrum rod resulting in a leftward linear translation of the fulcrum rod centerline axis, the distance between the line of movement of the pushrod relative to the fulcrum rod 16 decreases, and the distance between the line of movement of the valve stem 40 relative to the fulcrum rod correspondingly increases. The combined effect of these two changes in distances is to increase the ratio of moment arms of the valve stem relative to the fulcrum rod pivot point and the pushrod relative to the fulcrum rod pivot point. This, therefore, results in an increase in distance of linear travel of the valve stem for a given constant distance of linear travel of the pushrod. In this manner, it is a simple matter to increase the amount of valve opening in response to increased engine speed or other engine criteria while the engine is in operation, to thereby permit instant increase in fuel/air mixture intake upon demand.

In a similar manner, when engine speed or other criteria reverse or decrease, the sensing mechanism mentioned hereinabove but not described in detail causes rotation of the fulcrum rod in the clockwise direction, effecting a linear translation of the axis thereof in the rightward direction as shown in FIGS. 2 and 3. This linear translation in the rightward direction relative to the rocker arm decreases the distance between the line of movement of the valve stem and the fulcrum rod, and correspondingly increases the distance between the line of movement of the pushrod and the fulcrum rod, thereby decreasing the ratio of these moment arms about the fulcrum rod pivot point. This, therefore, has the effect of decreasing the amount of valve opening for a given constant distance of linear travel of the pushrod. This lesser opening of the valve 24, of course, reduces the intake of fuel/air mixture when high engine torque and power ar not necessary, thereby accomplishing the ultimate desired effect of reducing fuel consumption under decreased engine load conditions.

Those skilled in the art should immediately recognize that because one of the moment arms about the fulcrum rod increases simultaneously with a decrease in the other moment arm as the fulcrum rod is rotated, the resulting change in ratio of moment arms may be significant for only a slight or moderate degree of rotation of the fulcrum rod. Therefore, it will be appreciated that only a very slight rotation of the translatable fulcrum rod is required to effect a significant change in amount of valve opening.

The grooves and splines on the fulcrum rod cooperating with the mating splines and grooves on the stationary shaft support and the rocker arm serve two primary functions: (1) because the splines and grooves of the fulcrum rod mating with cooperating grooves and splines of the stationary shaft support prevent pure rotation of the fulcrum rod relative to the shaft support aperture lower inner surface, any rotation of the fulcrum rod results in a linear translation of the geometric centerline axis of the rod in a plane parallel to the surface of alternating splines and grooves of the shaft support; and (2) because the shaft support aperture spline and grooves are stationary relative to the valve head, and therefore relative to the pushrod and valve stem, as the fulcrum rod meshes within these splines and grooves during movement, a "walking action" of the fulcrum rod relative to the shaft support results. Because the splines and grooves on the rocker arm mesh with the identical grooves and splines on the fulcrum rod with which the shaft support splines and grooves mesh, this "walking action" of the fulcrum rod relative to the shaft support creates an identical "walking action" of the fulcrum rod relative to the rocker arm. This "walking action" of the fulcrum rod relative to the rocker arm serves to maintain the rocker arm in functional alignment relative to the pushrod and valve stem, while simultaneously translating the actual pivot point of the rocker arm about the fulcrum rod relative to the pushrod and the valve stem. In other words, this rotational and linear movement of the fulcrum rod within the rocker arm, which is determined by the rotational and linear movement of the fulcrum rod within the stationary shaft support, dictates that the rocker arm maintain its position relative to the lines of reciprocating movement of the pushrod and valve stem, and prevents the rocker arm from shifting relative thereto (either to the right or to the left as shown in the drawings).

It should be noted that the end walls 57 of the shaft support aperture 56 are much closer together than corresponding end walls 31 or the rocker arm aperture 29. In this manner, the amount of lateral translation of the fulcrum rod within the shaft support, and therefore within the rocker arm, may be easily controlled to prevent excessive opening of the valve which would damage the valve and piston head. This aditional protection against excessive valve opening is provided for instance wherein the mechanism for controlling the fulcrum rod rotation malfunctions and would rotate and shift the fulcrum rod too far to the left, but for the mechanical stop provided by the left shaft support aperture end wall 57.

Additionally, it should be noted that, in any given position of the fulcrum rod relative to the rocker arm, as the rocker arm rotates in the clockwise direction in order to open the valve, the actual point of pivot of the rocker arm about the fulcrum rod moves along the periphery of the fulcrum rod in the clockwise direction as the mating splines and grooves intermesh. The effect of this is that the actual rate of valve opening increases slightly as the amount of valve opening increases, due to the fulcrum pivot point "creeping" or "walking" in the clockwise direction around the bottom splined surface of the fulcrum rod. It has been determined that this rate of increase of valve opening is negligible, and can be compensated for in the specific engine design, if so desired. The first alternative embodiment, described hereinbelow, will have the reverse effect due to the reverse position of the splines on the fulcrum rod, rocker arm and shaft support. In some instances, it may be advantageous to utilize this slight change in rate of valve opening to full benefit.

FIRST ALTERNATIVE EMBODIMENT

Figure 4:
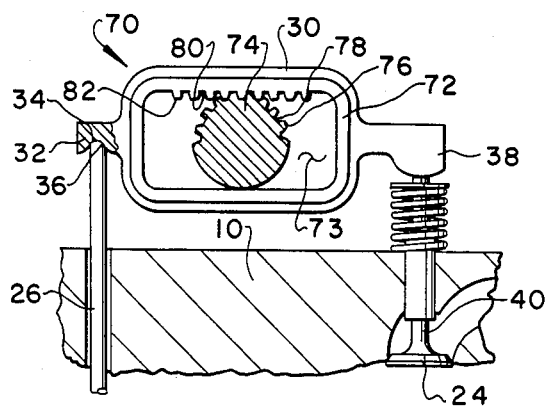
FIG. 4 is a side view similar to FIG. 2 of a first alternative embodiment, showing the mating splines along the upper surface of the fulcrum rod.
Figure 5:
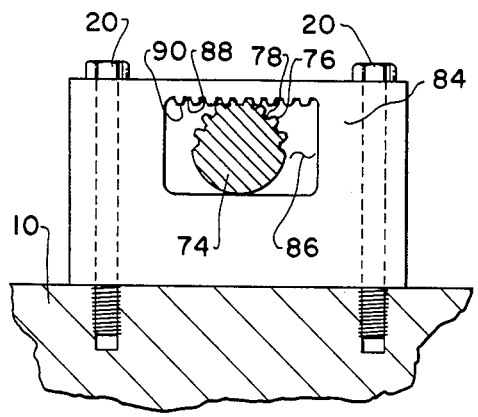
FIG. 5 is a side view similar to FIG. 3 of the shaft support utilized with the rocker arm of FIG. 4.

Turning now to FIGS. 4 and 5, a first alternative embodiment of the variable ratio rocker arm mechanism employing the concept of the instant invention is shown. It should be understood that this first alternative embodiment of the rocker arm assembly (the shaft support, fulcrum rod and rocker arm) is interchangeable, as a unit, with the preferred embodiment just described. This alternative embodiment includes a rocker arm 70 basically similar to the rocker arm 14 of the preferred embodiment. This rocker arm 70 includes a genereally rectangular sleeve 72 permanently mounted within a body portion 30, as in the preferred embodiment, the sleeve defining an aperture 73 through which the fulcrum rod is functionally positioned for oscillatory pivotal movement thereabout. Like the rocker arm of the preferred embodiment, this rocker arm body portion includes respective first and second ends 32, 38. This embodiment includes a fulcrum rod 74, which as shown, may be identical to the fulcrum rod 16 of the preferred embodiment functionally positioned 180° about its centerline axis from that of the preferred embodiment. As shown, this fulcrum rod 74 includes a series of axial splines 76 defining fulcrum rod axial spline grooves 78. These splines and grooves 76, 78 functionally mesh with mating grooves and splines 80, 82 on the upper inner surface of the rocker arm aperture 73. It should be obvious to those skilled in the art that, as in the rocker arm of the preferred embodiment, this first alternative embodiment of the rocker arm 70 pivots about the fulcrum rod 74 about a pivot point that moves generally around the periphery of the fulcrum rod splines and grooves 76, 78 at the point of intermesh with the mating rocker arm grooves and splines 80, 82, as opposed to pivoting about the generally geometric center of the rocker arm 70, as in conventional rocker arm and fulcrum rod assemblies. Therefore, the interface between the lower portion of the fulcrum rod 74 and the upwardly facing mating portion of the rocker arm sleeve aperture 73 is a sliding interface as the rocker arm pivots about the fulcrum rod generally at the opposite surface of the fulcrum rod (i.e., the meshing splines and grooves). It should also be readily apparent that in the rocker arm and fulcrum rod assembly of FIG. 4, the load bearing surfaces carrying the frictional force between the rocker arm and fulcrum rod are the just described smooth surfaces opposite the grooves and splines (i.e., the lower rounded surface of the fulcrum rod and the essentially planar surface of the rocker arm sleeve 72 defining the aperture 73 therein). Therefore, these mating surfaces should be surface-hardened and highly ground and polished in order to minimize any frictional reaction therebetween due to the sliding motion of the rocker arm relative to the fulcrum rod.

FIG. 5 depicts a stationary shaft support 84 for use with the rocker arm 70 and fulcrum rod 74 shown in FIG. 4. The fulcrum rod 74 is functionally positioned within an aperture 86 provided in the stationary block 84. The axial splines and spline grooves 76, 78 on the top surface of the fulcrum rod mesh with mating grooves and splines 88, 90 formed in the upper surface of the shaft support aperture 86 to retain the fulcrum rod in functional position relative to the valve head 10 in a manner identical to the splines and grooves 60, 62 in the shaft support 18 of FIG. 3.

OPERATION OF THE FIRST ALTERNATIVE EMBODIMENT

The first alternative embodiment of the variable ratio rocker arm mechanism shown in FIGS. 4 and 5 operates in a manner almost identical to that of the preferred embodiment shown in FIGS. 2 and 3. However, as should be apparent to those skilled in the art from a reading and undertanding of the operation of the preferred embodiment, rotation of the fulcrum rod 74 in the same direction as that of the fulcrum rod 16 will result in the opposite effect as that in the device of the preferred embodiment. Specifically, rotation of the fulcrum rod 74 in the clockwise direction causes a linear translation of the geometric axis of the rod in the leftward direction as the rod "walks" in the grooves and splines of the shaft support aperture. This, of course, causes the fulcrum rod 74 to "walk" along the mating splines and grooves 82, 80 in the rocker arm rectangular sleeve, effecting a linear translation of the fulcrum rod axis in the leftward direction as viewed in FIG. 4. The effect of this is to increase the distance between the pivot point of the rocker arm about the fulcrum rod to the line of linear movement of the valve stem, and simultaneously therewith, decrease the distance from the pivot point of the rocker arm about the fulcrum rod to the line of movement of the pushrod, thereby increasing the ratio of moment arms of the valve stem relative to the fulcrum rod pivot point and the pushrod relative to the fulcrum rod pivot point. This, therefore, results in increasing the stroke or amount of valve opening of the valve 24 for a given constant distance of linear displacement of the pushrod. Similarly, a counterclockwise rotation of the fulcrum rod has the effect of translating the geometric axis therefore in a rightward direction in both the shaft support 84 and the rocker arm 70. This counterclockwise rotation of the fulcrum rod therefore has the effect of decreasing the ratio of moment arms of the valve stem and pushrod relative to the fulcrum rod pivot point. Therefore, it can be seen that the effect is the same in each of these embodiments of the variable ratio rocker arm mechanism, the difference being the direction of rotation of the fulcrum ord which effects the desired increase or decrease in the ratio of moment arms about the fulcrum rod.

Those skilled in the art will also readily note that in the shaft support 84 shown in FIG. 5, the frictional force between the fulcrum rod and the shaft support is carried by the mating load bearing surfaces having the intermeshing grooves and splines. Therefore, in this embodiment, those particular load bearing surfaces on the upper portion of the fulcrum rod and the upper section of the shaft support aperture having the intermeshing grooves and splines should be surface-hardened and highly ground and polished in order to reduce the effect of any frictional forces therebetween.

SECOND ALTERNATIVE EMBODIMENT

A second alternative embodiment of the variable ratio rocker arm assembly utilizing the concept of the present invention is shown in FIGS. 6, 7, 8A and 8B. This rocker arm 100 shown in FIG. 6 is functionally identical to the rocker arm 14 of FIG. 2. The rocker arm 100 includes a body portion 104 having a first end 106 and a second end 108. In this regard, the second alternative embodiment of the rocker arm 100 is essentially identical to the rocker arm 14 shown in FIG. 2 prior to the grooves being machined therein to define the splines along the bottom surface of the aperture. The second alternative embodiment of the rocker arm 100 further includes a mounting sleeve 110 having a generally rectangular cross-section as in the previous embodiments. Additionally, however, this alternative rocker arm sleeve 110 is adapted to receive within a through aperture 112, a spline insert 114 at each end thereof (i.e., at each open edge of the through aperture). A best shown in FIG. 6, these inserts 114 are formed with alternating splines and grooves 116, 118. These inserts 114 are pressed, and otherwise permanently fitted, into receptacles 120 formed within the body of the rocker arm sleeve 110 in a manner that the inside surface 122 of the sleeve aperture is slightly higher than the top surfaces of the insert splines 116. In this manner, a cylindrical fulcrum rod (not shown) is free to slide and rotate within the through aperture 112 against these inside surfaces 122.

This second alternative embodiment utilizes a circular fulcrum rod having no splines thereon. In this manner, the load bearing surfaces of the rod, rocker arm and shaft support are smooth and essentially free of frictional forces. In order to effect the selected translation of the fulcrum rod relative to the rocker arm, the circular fulcrum rod employs splined rings 126, shown in FIGS. 8A and 8B attached thereto on each side of the rocker arm 100. The rings 126 include splines 128 formed thereon which mesh with mating grooves and splines 118, 116 formed in the inserts 114 to effect positioning of the fulcrum rod. These rings 126 are attached to the fulcrum rod during assembly of the rocker arms onto the rod. In this regard, the rings 126 may include keying tabs 130 that engage axial slots (not shown) formed in the fulcrum rod in a customary manner. In order to prevent the force transmitted through the fulcrum rod to be across these slots, they should be formed between these load bearing surfaces, as shown by the keying tabe 130 formed in the spline rings 126.

FIG. 8B shows the relative size and thickness of the spline insert 114 and spline ring 126. The spline ring is thicker than the rocker arm insert in order to provide access to means for attaching the ring to the fulcrum rod as, for example, by the use of a set screw 132.

It should be readily apparent to those skilled in the art that these inserts 114 impart a structural integrity to the rocker arm sleeve and, more importantly, provide an exceptionally wear resistant surface to the splines and grooves 116, 118 that cooperate with mating splines 127 of the fulcrum rod spline rings in order to minimize the frictional wear therebetween, maximize the useful life of the rocker arm 100 and optimize the dimensional tolerances of the mating splines and grooves for improved accuracy and increased useful life.

THIRD ALTERNATIVE EMBODIMENT

Those skilled in the art will readily appreciate that the load bearing sliding surfaces should be as free from frictional forces as is possible. In conventional rocker arm assembles (and in the instant rocker arm assembly), those load bearing mating surfaces are the upper inside surface of the shaft support aperture as it engages the upper cylindrical surface of the fulcrum rod, and the lower inside surface of the rocker arm aperture as it engages the lower surface of the fulcrum rod. In order to eliminate the frictional force created by the rocker arm sleeve in sliding cooperation with the fulcrum rod as the rocker arm pivots or oscillates thereabout, and as the fulcrum rod is rotated in order to effect the desired change in moment arm ratios to increase or decrease the amount of valve opening, these mating, load bearing surfaces should be surface-hardened and appropriately ground and polished. Additionally, it should be appreciated that it is common practice to provide one stationary shaft support for every 2-4 rocker arms mounted on the fulcrum rod. The upper inside surface of the shaft support aperture must bear the load for each of these 2-4 rocker arms. As will be apparent from a study of the previous embodiments, this increased load must, by definition, be carried by the surface defining the grooves and splines in either one or the other of the rocker arms and shaft supports. In the instance wherein the load bearing force carried by the upper surface of the shaft support aperture is a smooth surface (See FIG. 3), it may be advantageous to utilize a roller bearing or roller bearing assembly functionally positioned between the fulcrum rod and the upper inside surface of the shaft support aperture, as shown in FIG. 9. A roller bearing assembly 134 of the type ahown eliminates any sliding frictional forces between the upper surface of the fulcrum rod and the inside surface of the shaft support aperture by virtue of the single layer roller bearing design. In this embodiment, the roller bearing assembly 134 comprises a housing 136, carrying two roller bearings 138. Obviously, a roller bearing assembly of this type, when used between the load bearing surfaces of the shaft support and fulcrum rod, cannot also be used between the mating load bearing surfaces of the fulcrum rod and the rocker arm, in that those surfaces are on the lower side of the fulcrum rod, and have the groove and spline arrangement. Also, of course, it would not be necessary to incorporate a roller bearing assembly on the upper surface of the fulcrum rod in each of the rocker arms, in that there is no appreciable frictional force between those two mating surfaces.

However, in the event the first alternative embodiment of the rocker arm assembly described herein in conjunction with FIGS. 4 and 5 is utilized, it could be advantageous to incorporate the use of a roller bearing assembly 134 between the load bearing surfaces of the rocker arm and the fulcrum rod, as shown in FIG. 10. It should be apparent that when the embodiment of the rocker arm of FIG. 10 is utilized, a roller bearing assembly cannot be used between the load bearing surfaces of the fulcrum rod and the shaft support, in that those mating load bearing surfaces are the surfaces having the splines and grooves formed therein. Additionally, in this particular embodiment, it would be unnecessary to utilize a roller bearing assembly between the lower surface of the fulcrum rod and the opposing surface of the shaft support, in that there is no appreciable frictional force between those surfaces.

FOURTH ALTERNATIVE EMBODIMENT

Figure 11:
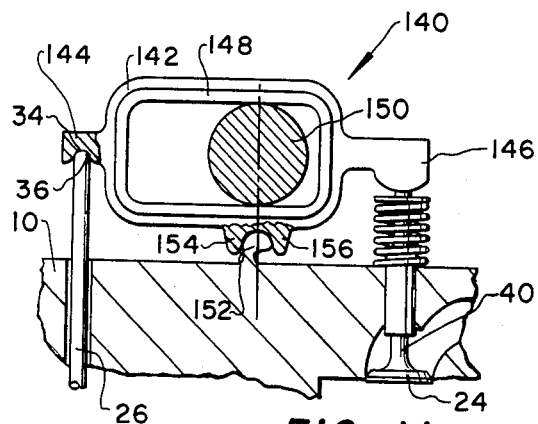
FIG. 11 is a side view of a fourth alternative embodiment of a rocker arm incorporating alternative means for maintaining the rocker arm in functional position relative to the valve stem and pushrod.

FIG. 11 depicts a fourth alternative embodiment designed to maintain the variable ratio rocker arm utilizing the concept of the present invention in functional relationship relative to the pushrod and valve stem. In this embodiment, a rocker arm 140 comprises a main body portion 142 having a first end 144 and a second end 146. The body portion has press-fitted or otherwise permanently mounted therewith a sleeve 148 having a generally rectangular cross-section. In this embodiment, a fulcrum rod 150 is utilized, the rod being similar to fulcrum bars utilized in conventional rocker arm assemblies, i.e., a hollow, round rod having no axial splines formed thereon.

In this embodiment, the rocker arm 140 is retained in functional relation relative to the pushrod 26 and the valve stem 40 by a set of cooperating ribs formed on the rocker arm and the top surface of the valve head 10. As shown, a first rib 152 projects upwardly from the top surface of the valve head 10 in a manner to cooperate with second and third ribs 154, 156 formed on the rocker arm body portion 142. These cooperating ribs 152, 154, 156 need not be of any specified width, but need be sufficient only to prevent the rocker arm 40 from: (1) shifting from front to back (from side to side as shown in FIG. 11); and (2) torquing or otherwise askewing relative to an axis parallel with the line of travel of the pushrod 26 and/or the valve stem 40.

In this embodiment, as in the previous embodiments, the ratio of moment arms of the pushrod and valve stem about the fulcrum bar is controlled by translating the pont of pivot of the rocker arm about the fulcrum rod in an essentially linear path between the pushrod and valve stem. In previous embodiments, the rocker arms were retained in functional relationship relative to the pushrod and valve stem by the action of the cooperating splines and grooves on the rocker arm and fulcrum rod. In this embodiment, the first, second and third ribs 152, 154, 156 for retaining the rocker arm in relative functional position are designed to permit the rocker arm 140 to pivot relative to the central axis of the fulcrum rod 150 within the range of transverse linear movement of the fulcrum rod as determined by the engine design characteristics. Those skilled in the art will readily appreciate that the relative movement between the first, second and third ribs 152, 154, 156 is essentially movement about an arc having its center point the axis of the fulcrum rod 150. To accomplish this, the upper surfaces of the first rib 152 and the mating inner surfaces between the second and third ribs 154, 156 are appropriately contoured to permit freedom of movement of the rocker arm within tolerance limits dictated by the specific design criteria of the valve head pushrod, valve stem, fulcrum rod and rocker arm interface. Such are appropriate design criteria left to those skilled in the art. Obviously, the position of the three ribs 152, 154, 156 may be reversed, (i.e., a single rib depending downwardly from the rocker arm 140 to engage and otherwise mate with ribs extending upwardly on either side thereof from the body of the valve head 10), to accomplish the same effect of retaining the rocker arm in functional position relative to the pushrod and valve stem while permitting the fulcrum rod to be translated in order to effect the desired change of moment arm ratios thereabout. It should be noted, however, that in either configuration, the center, single rib 152 should be located essentially in alignment with the center axis of the fulcrum rod when the rod is located in its position of steady-state engine operation, i.e., at "cruise" when the amount of valve opening is minimal. In this manner, movement and resulting friction between the ribs is held to a minimum during this most frequent steady-state operation. Increased friction would result when the fulcrum rod is shifted away from steady-state position (generally to the left in FIG. 11); however, this would be only for brief intermittent times during acceleration, thereafter, the fulcrum rod returning to the steady-state cruise position wherein the friction between the ribs is minimal.

Those skilled in the art will readily appreciate that the fulcrum bar 150 of this embodiment also includes means for translating the bar, as in previous embodiments. For example, splined rings similar to those shown in FIG. 8A may be affixed to the fulcrum rod and adapted to engage mating splines on the stationary support block shown in FIGS. 3, 5 or 9.

FIFTH ALTERNATIVE EMBODIMENT

Figure 12:
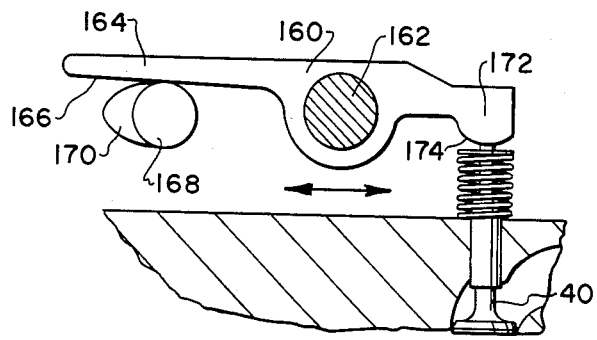
FIG. 12 is a side view of a fifth alternative embodiment of a rocker arm pivotally mounted on a fulcrum shaft which is laterally translatable relative to the valve stem and camshaft.

FIG. 12 depicts a fifth alternative embodiment that utilizes a different structural form in employing the basic concept of the shiftable fulcrum point of the present invention. A modified rocker arm 160 is rotatably mounted on a fulcrum rod 162 for rotational oscillator movement thereabout. The rocker arm 160 has an elongate first end 164 having a smooth and polished undersurface thereof 166 that engages a rotating cam-shaft 168 having a plurality of lobes 170 thereon. The rocker arm also includes an essentially elongate second end 172 having a surface-hardened and polished contoured valve stem engaging surface 174 for depressing the valve stem in order to open the valve. As in the previous embodiments, the fulcrum rod 162 of this alternative embodiment is adapted to shift laterally (i.e., side-to-side as shown in FIG. 12) in order to shift the actual pivot point of the rocker arm thereabout relative to the linear line of movement of the valve stem 40 and the effective point of contact of the camshaft 168 as it engages the rocker arm first end undersurface 166.

As in the fifth alternative embodiment, the fulcrum bar of this embodiment may also utilize splined rings (as shown in FIG. 8A) affixed thereto and adapted to engage mating splines on that stationary support blocks shown in FIGS. 3, 5 or 9.

It should be apparent to those skilled in the art that this fifth alternative embodiment of the rocker arm shown in FIG. 11 functions to vary the ratio of moment arms about the fulcrum rod 162 of the actual point of contact of the valve stem 40 with the rocker arm second end 72 relative to the point of contact of the valve stem first end 166 with the camshaft 168. It can be seen that lateral shifting of the fulcrum rod 162 accomplishes the same desired effect. It should be noted that the rocker arm second end contoured surface 174 is elongated sufficiently to permit the rocker arm 160 to shift from right to left as shown in FIG. 12 within the full range of adjustable valve opening in accordance with specific engine design criteria. As previously noted, such design criteria are left to those skilled in the art.

SIXTH ALTERNATIVE EMBODIMENT

Figure 13:
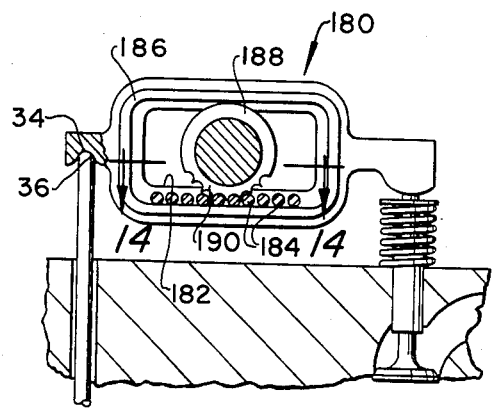
FIG. 13 is a side view of a sixth alternative embodiment of a rocker arm and fulcrum rod assembly.
Figure 14:
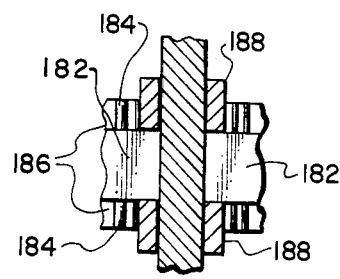
FIG. 14 is a horizontal sectional view taken along lines 14—14 in FIG. 13.

FIG. 13 depicts a sixth alternative embodiment of the rocker arm and fulcrum rod mechanism. This embodiment is similar to that shown in FIGS. 6, 7, 8A and 8B, in that the load bearing surfaces of the rocker arm 180 are the lower cylindrical surface of the fulcrum rod 150 as it engages the upward facing inner surface 182 of the aperture formed in the rocker arm. In this manner, the load bearing surfaces are smooth and essentially friction free. In this embodiment, the splines and grooves formed in the lower surface of the rocker arm 180 are replaced by a series of hardened dowel pins 184 that are pressed through the rocker arm to form a series of parallel semi-cylindrical gear type teeth at each open edge of the aperture formed in the rocker arm. As shown in FIG. 14, these dowel pins 184 extend from each side of the load bearing surface 182 similar to the splines 116 which extend from either edge of the load bearing surface 122 in the embodiment shown in FIGS. 6 and 7. These dowel pins 184 are positioned adjacent the bottom surface of the sleeve 186 formed in the rocker arm in order to provide structural integrity to the rocker arm.

The rocker arm shown in FIG. 13 operates with a round, non-splined fulcrum rod 150. In this embodiment, however, a ring 188 having sprocket type teeth 190 formed on the bottom surface thereof is functionally mounted on the fulcrum rod in a manner similar to that of the spline ring shown in FIG. 8A. As in the second alternative embodiment, this dowel pin and sprocket arrangement enables the fulcrum rod 150 to rotate/translate within the aperture formed in the rocker arm in order to effect the desired shifting of ratio of moment arms about the fulcrum rod. Those skilled in the art will readily appreciate that when utilizing the rocker arm of this sixth alternative embodiment, it is preferable to incorporate a similar sprocket and dowel pin gearing mechanism into the shaft supports in order that the incremental rotations of the fulcrum rod relative to the rocker arm will be identical to incremental rotations relative to the shaft support, thereby retaining the rocker arms in proper alignment relative to the pushrod and valve stem.

Those skilled in the art will readily appreciate that the overall concept of the variable ratio lever arm mechanism as described in conjunction with its application to a rocker arm assembly for an internal combustion engine is particularly advantageous in permitting variations of the valve opening while the internal combustion engine is operating, in response to variations in engine load and torque demand. It should be obvious from the above description and operation, in conjunction with the accompanying drawings, that the variable ratio rocker arm assembly mechanism comprises, in fact, a series of rocker arms functionally mounted on a single fulcrum rod. In this manner, the variable ratio rocker arm mechanism controls the amount of valve opening for each of the valves simultaneously so that uniform amounts of fuel/air mixture enter the combustion chambers, and comparable amounts of exhaust gases exit the combustion chamber in order to maintain the power output of each individual internal combustion cylindr uniform with the other cylinders of the engine. As an example of another application of the instant invention, the fulcrum point of a force or work transmitting lever arm may easily and readily be shifted in one direction to increase the output force of the fulcrum lever arm, or shifted in the opposite direction to increase the length of stroke of the output lever. In such an application, the lever arm could be formed with alternating splines and grooves along the side thereof opposite the side which receives and transmits the input force. The fulcrum rod could be formed with mating grooves and splines aroung the entire circumference thereof to permit drastic variations in output force and reciprocating distance of travel for a constant input force and travel distance.

Although a preferred embodiment and a number of alternative embodiments of the present invention have been disclosed in detail herein, it will be understood that various substitutions and modifications may be made to the preferred and alternative embodiments described herein without departing from the scope and spirit of the present invention as recited in the appended claims.

What is claimed is:

1. Rocker arm apparatus for use in combination with a valve stem and push rod of an internal combustion engine comprising an elongated body member having a first end portion for engaging the valve stem and having a second end portion for engaging the push rod, said body member having an elongated slot located intermediate said first and second end portions; shifting means received within the elongated slot and movably disposed along said body member in said slot; and, positioning means including mating toothing portions carried by said body member and said shifting means, said positioning means establishing a point of pivotal engagement between said shifting means and said elongated body member and allowing controlled translation of said shifting means within said slot, characterized in that said shifting means is a geared fulcrum member disposed in mating toothing engagement with said elongated body member, and further characterized in that a roller bearing assembly is disposed intermediate said fulcrum member and said elongated body member for providing rolling support for said fulcrum member.

2. Rocker arm apparatus as defined in claim 1, further characterized in that an operating arm is movably coupled to said fulcrum member or moving said shifting means relative to said elongated body member in response to a change in magnitude of an operating parameter of the internal combustion engine, whereby in response to movement of said operating arm, the geared fulcrum member is simultaneously rotated and translated along said mating toothing from one point of pivotal engagement, corresponding to one engine operating condition, to another point of pivotal engagement, corresponding to another engine operating condition.

3. Rocker arm apparatus as defined in claim 1, characterized in that for supporting the shifting means there is provided a stationary support member having an elongated slot, mating toothing portions being formed on said shifting means and on said support member, said mating toothing portions being disposed within said support member slot, and further characterized that a roller bearing assembly is disposed within said support member slot intermediate said shifting means and said stationary support member for providing rolling support for said shifting means.

4. Rocker arm apparatus as defined in claim 3, characterized in that the toothings of said support member and of the shifting means are disposed on opposite sides of the elongated slots, respectively.

5. An adjustable length rocker arm assembly comprising a base with a support rigidly mounted thereon, said support having a rod seat and a toothed rack separated by a slot, a fulcrum rod received in said slot and movable relative to the support and having curved sector and a toothed sector, said toothed rod sector engaging said toothed rack, a rocker arm pivotally supported on the fulcrum rod, an actuator arm coupled to said rod for simultaneously rotating and translating said rod relative to said rack, characterized in that, in order to increase the accuracy of adjustment, a roller bearing assembly is disposed between the rod curved sector and the rod seat, wherein the toothed rod sector is rollable along the toothed rack, and the roller bearing assembly is rollable along the rod seat.

6. The rocker arm assembly according to claim 5, characterized in that a second support having a rod seat is secured on the base on the opposite side of the rocker arm, and a second toothed rack is secured in the slot of the second support and engaged with the rod toothed sector.

7. The rocker arm assembly according to claim 5, characterized in that a slot is provided in the rocker arm for receiving the fulcrum rod, and including a toothed rack disposed in said rocker arm slot in toothed engagement with the rod toothed sector.

8. The rocker arm assembly according to claim 7, characterized in that the toothed rack of the rocker arm comprises first and second toothed portions disposed in the rocker arm slot on opposite sides thereof, the rod toothed sector being formed on rings which are rigidly coupled to the rod and are arranged thereon according to the arrangement of the toothed rack portions in the rocker arm slot, and the outer diameter of the fulcrum rod is smaller than the outer diameter of the teeth of the sectors.

* * * * *